US006407835B1

(12) United States Patent
Donald

(10) Patent No.: US 6,407,835 B1
(45) Date of Patent: Jun. 18, 2002

(54) SINGLE SITE FOR HEALING DUAL OPTICAL RINGS

(75) Inventor: David K. Donald, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/263,749

(22) Filed: Mar. 5, 1999

(51) Int. Cl.[7] .......................... H04B 10/08; H04B 10/12
(52) U.S. Cl. ........................ 359/110; 359/173
(58) Field of Search ................. 359/109, 110, 359/173, 144, 142, 7; 385/15–18

(56) References Cited

U.S. PATENT DOCUMENTS

| 4,121,884 | A |   | 10/1978 | Greenwood | 350/96.15 |
|---|---|---|---|---|---|
| 5,321,774 | A |   | 6/1994 | Barnard et al. | 385/16 |
| 5,699,462 | A |   | 12/1997 | Fouquet et al. | 385/18 |
| 5,732,168 | A |   | 3/1998 | Donald | 385/16 |
| 5,828,799 | A | * | 10/1998 | Donald | |
| 5,960,131 | A | * | 9/1999 | Fouquet et al. | |
| 6,154,586 | A | * | 11/2000 | MacDonald et al. | |

FOREIGN PATENT DOCUMENTS

| EP | 0859260 | 8/1998 | G02B/26/02 |
|---|---|---|---|
| EP | 0871053 | 10/1998 | G02B/26/02 |

* cited by examiner

Primary Examiner—Jason Chan
Assistant Examiner—Dzung Tran

(57) ABSTRACT

An apparatus and a method for controlling transmissions over an optical signaling network include one or more traffic detectors that are connected to an optical switch to receive incidentally reflected light when the switch is in a transmissive state. The switch is in the transmissive state when a fluid fills a fluid-manipulable chamber, but is in a reflective state when the chamber is free of fluid. The apparatus includes two inputs and two outputs. Typically, the inputs and outputs are waveguides having an index of refraction which approximates the index of refraction of the fluid. The traffic detectors monitor light which is incidentally reflected at interfaces of the waveguides with the chamber. Under fault-free conditions in which signal transmissions are detected to be normal, a first input is connected to a first output and a second input is connected to a second output. However, when a fault condition is detected, the two inputs exchange outputs by reversing the state of the optical switch. In the preferred embodiment, the fault-free condition is one in which the switch is in the reflective state. However, the reflective state is disabled and the transmissive state is established if a fault condition is detected. A prolonged absence of signal transmissions along one of the inputs is indicative of a fault condition. With the switch in the transmissive state, incidentally reflected light is monitored to detect a return to the fault-free condition. The outputs are again exchanged upon recognition of the fault-free condition. Optionally, the outputs are monitored to detect reverse driven "request for resumption" signals, and the reflective state is established if reverse driven signals are detected on both outputs, regardless of the indication of a fault along one or both of the inputs. In a second embodiment, the fault-free condition establishes a transmissive state, with incidentally detected light being monitored to determine if a fault condition requires a change to the reflective state.

18 Claims, 12 Drawing Sheets

SINGLE SITE FOR HEALING DUAL OPTICAL RINGS

TECHNICAL FIELD

The present invention relates generally to fiberoptic communications networks and, more specifically, to a method and an apparatus for controlling transmissions over fiberoptic networks.

BACKGROUND ART

While signals within telecommunications and data communications networks have traditionally been exchanged by transmitting electrical signals via electrically conductive lines, an alternative medium of data exchange is the transmission of optical signals through optical fibers. Information is exchanged in the form of modulated laser-generated light. The equipment for efficiently generating and transmitting the optical signals has been designed and implemented, but the design of optical switches for use in telecommunications and data communications networks is problematic. As a result, switching requirements within a network that transmits optical signals are often satisfied by converting the optical signals to electrical signals at the inputs of a switching network, then reconverting the electrical signals to optical signals at the outputs of the switching network.

Recently, alternate optical switching systems have been developed. U.S. Pat. No. 5,699,462 to Fouquet et al., which is assigned to the assignee of the present invention, describes a switching matrix that may be used for routing optical signals from one of a number of parallel input optical fibers to any one of a number of parallel output optical fibers. An isolated first switching element 110 is shown in FIG. 1. The optical switch of FIG. 1 is formed on a substrate. The substrate may be silicon, but other materials may be used. The silicon substrate includes planar waveguides defined by a lower cladding layer 114, a core 116, and an upper cladding layer (not shown). The core material is primarily silicon dioxide, but with other materials that achieve a desired index of refraction for the core. The cladding layers should be formed of a material having a refractive index that is sub-stantially different from the refractive index of the core material, so that optical signals are guided along the waveguides.

The core 116 is patterned to form an input waveguide 120 and an output waveguide 126 of a first optical path and to define a second input waveguide 124 and a second output waveguide 122 of a second optical path. The upper cladding layer is then deposited over the patterned core material. A chamber 128 is formed by etching a trench through the core material and the two cladding layers to the substrate. The waveguides intersect the trench at an angle of incidence greater than the critical angle of total internal reflection (TIR) when the location 130 aligned with the waveguides is filled with vapor or gas. Thus, TIR diverts light (A) from the input waveguide 120 to the output waveguide 122 to exit as light (B), forming route (A→B). When an index-matching fluid resides within the location 130 between the aligned waveguides 120 and 126, the light (A) propagates through the trench 128 to exit the switching element as light (D), forming route (A→D). The trench 128 is positioned with respect to the four waveguides such that one sidewall of the trench passes through the intersection of the axes of the waveguides.

The above-identified patent to Fouquet et al. describes a number of alternative approaches to alternating the first switching element between a transmissive state and a reflective state. One approach is illustrated in FIG. 1. The first switching element 110 includes two microheaters 150 and 152 that control the position of a bubble within the fluid-containing chamber 128. The fluid within the chamber has a refractive index that is close to the refractive index of the core material 116 of the four waveguides 120–126. Fluid fill-holes 154 and 156 may be used to provide a steady supply of fluid, but this is not critical. In the operation of the first switching element, one of the heaters 150 and 152 is brought to a temperature sufficiently high to form a gas bubble. Once formed, the bubble can be maintained in position with a reduced current to the heater. In FIG. 1, the bubble is positioned at the location 130 of the intersection of the four waveguides. Consequently, an input signal along the waveguide 120 will encounter a refractive index mismatch upon reaching the chamber 128. This places the first switching element in a reflecting state, causing the optical signal along the waveguide 120 to be redirected to the output waveguide 122. However, even in the reflecting state, the second input waveguide 124 is not in communication with the output waveguide 126.

If the heater 150 at location 130 is deactivated and the second heater 152 is activated, the bubble will be attracted to the off-axis heater 152. This allows index-matching fluid to fill the location 130 at the intersection of the waveguides 120–126. The first switching element 110 is then in a transmissive state, since the input waveguide 120 is optically coupled to the collinear waveguide 126.

A concern with optical switching elements of the type shown in FIG. 1 is that in the transmissive state, a small amount of light is reflected from the switch. Reflection during the transmissive state is a result of the less than precise match between the indices of refraction of the fluid filling the chamber 128 and the waveguide core material 116. A precise match between the indices is difficult to accomplish because multiple considerations impact the selection of a fluid. For example, because the fluid is manipulated using thermal energy, the thermal properties of the fluid must also be considered. As the mismatch between the refractive index of the fluid and the refractive index of the core material increases, the portion of an optical signal that is reflected at the switch increases. Currently, the incidentally reflected light is not beneficially utilized in switching systems. On the contrary, if the incidentally reflected light leaks into an adjacent waveguide, the result can be undesirable crosstalk.

What is needed is an apparatus and a method for advantageously utilizing light that is incidentally reflected from a fluid-manipulable optical switch when the switch is in a transmissive state. What is further needed is such an apparatus and method that introduce little or no crosstalk.

SUMMARY OF THE INVENTION

An apparatus and a method for controlling transmissions over an optical network include at least one traffic detector connected to an optical switch to receive incidentally reflected light when the switch is in a transmissive state. By utilizing the detection of incidentally reflected light, the traffic detector non-intrusively monitors the conditions of signal transmission capabilities to the switch. Depending upon detection of a fault condition, the optical switch is set in a reflective state or a transmissive state.

The apparatus includes a fluid-manipulable chamber, two inputs and two outputs. The inputs and outputs are waveguides that channel optical signals to and from the fluid-manipulable chamber. Under fault-free conditions in which signal transmissions are detected to be normal, a first input is connected to a first output, while a second input is connected to a second output. However, when a fault condition is detected, the two inputs exchange outputs by reversing the fluid-manipulable chamber with respect to its ability to propagate optical signals through the chamber.

In a preferred embodiment, the fault-free condition is one in which the fluid-manipulable chamber is in the reflective state. In this state, there is an absence of fluid at the interfaces of the inputs with the walls of the chamber. The resulting mismatch of indices of refraction at the interfaces causes optical signals to be reflected. In this preferred embodiment, the reflected signals from the first input are channeled to the first output, and the reflected signals from the second input are channeled to the second output. At least one of the two outputs is coupled to a traffic detector that monitors traffic along the output. Preferably, each output includes a traffic detector. If one of the traffic detectors recognizes an unexpected absence of signal transmissions, the absence is interpreted as an indication of a fault along the corresponding input. In conventional SONET ring applications, the medium (e.g., a first fiberoptic line) that provides the input for one of the transmission paths is laced or otherwise physically coupled to the medium (e.g., a second fiberoptic line) that forms the output for the other transmission path. Consequently, if the input of the first transmission path is not propagating signals, it is presumed that the output of the second transmission path is also faulty. Likewise, a fault along the second input is likely to coincide with a fault along the first output. For this reason, the fault condition triggers the transmissive state of the fluid-manipulable chamber, thereby coupling the non-faulty input to the non-faulty output.

In the transmissive state, the fluid-manipulable chamber is filled with a fluid that has a refractive index that closely matches the refractive index of the light-carrying core material of the inputs and outputs. However, since there will be some mismatch in the indices of refraction, a small amount of each optical signal that is transmitted through the chamber will be reflected at the walls of the chamber. This "incidentally reflected light" is used by the traffic detector or detectors to non-intrusively monitor the condition of the input which was determined to be faulty. When the appropriate traffic detector determines that signals are again flowing through the previously faulty input, the chamber is returned to its normal reflective state.

In an alternative embodiment, the transmissive state is the normal condition. The first input is aligned with the first output on opposite sides of the chamber. Similarly, the second input is optically aligned with the second output, so that the two are optically coupled when the fluid-manipulable chamber contains index matching fluid. In this embodiment, the traffic detector or detectors operate in the normal condition to monitor leakage light that is incidentally reflected as a result of a mismatch in the indices of refraction of the fluid and the core material through which optical signals are guided. An unexplained absence of incidentally reflected light is interpreted as an indication of a fault condition at a location upstream from the switch. It is also assumed that the output that is laced or otherwise physically coupled to the faulty input is malfunctioning. In order to minimize signal loss, the fluid-manipulable chamber is switched from the transmissive state to the reflective state, thereby coupling the non-faulty input to the non-faulty output.

While the fluid-manipulable chamber is in the reflective state, traffic detectors are used to determine when traffic is again being propagated along the input that was determined to be faulty. The transmissive state is re-established in response to determining that both inputs are functioning properly.

An advantage of the invention is that incidentally reflected light is utilized to monitor traffic within an optical network, such as a fiberoptic network. Thus, the monitoring occurs non-intrusively. Another advantage is that the detection of a fault condition automatically reroutes traffic, so as to avoid further signal loss.

DETAILED DESCRIPTION

Figure 2:
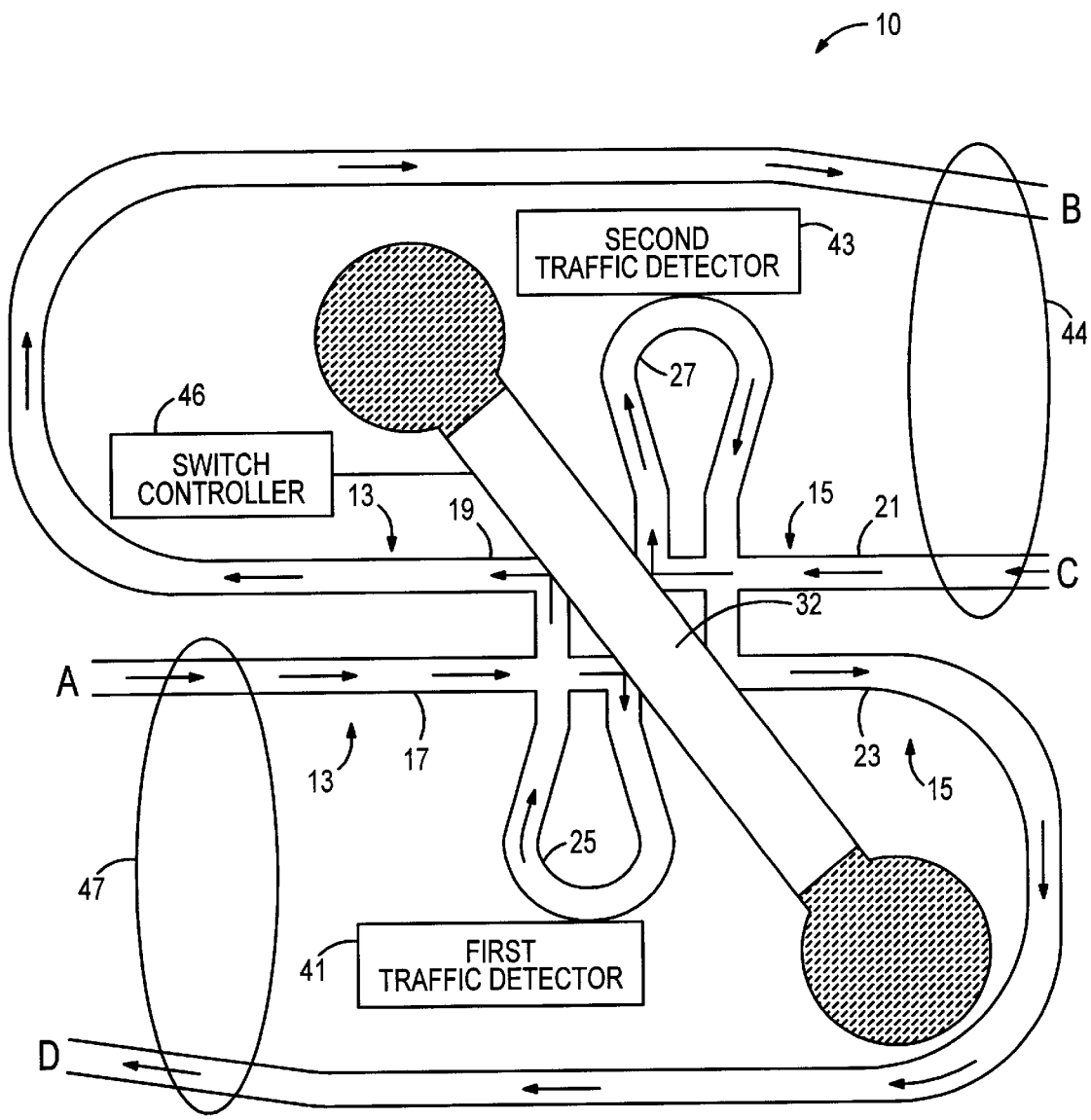
FIG. 2 is a schematic diagram of a preferred embodiment of an optical switch according to the present invention.

With reference to FIG. 2, a fiberoptic network, such as a SONET ring network, includes a fluid-manipulable optical switch 10 for monitoring and controlling signal transmissions over the network. In a preferred embodiment, the SONET ring network includes a first transmission route 13 (here right directed) and a second transmission route 15 (here left directed). Each route carries traffic uni-directionally, but the two routes co-operate to provide bi-directional communication.

The first conventional transmission route 13 (i.e., route A→B) includes a first input waveguide 17 connected to a fluid-manipulable chamber 32 of the optical switch 10. During a reflective state of the optical switch 10, optical signals (A) received over the first input waveguide 17 are reflected at the interface of the waveguide with the chamber 32. The reflected energy is directed onto a first intermediate waveguide 25 of the first transmission route 13. The first intermediate waveguide 25 shares a common connection to the chamber 32 with a first output waveguide 19. Thus, optical signals (A) received over the first input waveguide exit as light (B) via the first output waveguide 19 when the switch is in a reflective state.

The second transmission route 15 (i.e., route C→D) includes a second input waveguide 21 connected to the fluid-manipulable chamber 32. A second intermediate waveguide 27 shares a common connection to the chamber 32 with the second input waveguide 21, so that optical signals (C) received over the second input waveguide are reflected at the chamber 32 onto the second intermediate waveguide 27. The second intermediate waveguide shares a common connection to the chamber 32 with a second output waveguide 23, so that during the reflective state optical signals (C) received over the second input waveguide 21 are reflected onto the second output waveguide 23 for exit as light (D).

A switch controller 46 is provided to control the operating state of the optical switch 10 by selectively enabling the reflective state and a transmissive state of the switch. First and second traffic detectors 41 and 43 monitor signal transmissions along the first route 13 (A→B) and along the second route 15 (C→D) in order to determine whether the transmission routes are functioning properly. For example, when the switch is in the reflective state, the first traffic detector 41 detects clockwise signal transmissions (A) received over the first input waveguide. The presence of clockwise traffic indicates that connectivity with the source of optical signals (A) for the first transmission route is functioning.

The function of the first and second traffic detectors 41 and 43 are preferably performed by evanescent couplers. In a preferred embodiment, the evanescent couplers are a bi-directionally coupled pair of detectors which are capable of distinguishing the direction in which monitored traffic (A→B and C→D) is traveling. If the optical switch 10 is located near by a SONET receiver (not shown), it is likely that a receiver will employ a traffic detector which can perform the function of at least one of the traffic detectors of the switch. If the switch 10 is positioned between two closely located SONET receivers, the functions of both the first and the second traffic detectors 41 and 43 can be performed at the SONET receivers.

When the first traffic detector 41 observes an unanticipated absence of incoming traffic, the absence is interpreted as being indicative of a malfunction in the upstream source of signals (A) to the first transmission route 13. Furthermore, if optical fibers of the first and second transmission routes 13 and 15 are closely packaged together, as indicated by groupings 44 and 47, it is likely that a downstream portion (D) of the second transmission route is also malfunctioning. For example, an optical fiber of the first transmission route 13 may be severed while a trench is dug near fiberoptic lines that connect to the first input waveguide 17 and the second output waveguide 23. It is likely that the optical fiber connected to conduct signals (D) from the second output waveguide 23 has also been damaged. Consequently, it is undesirable to allow optical signals (C) to be propagated over the second transmission path 15 (C→D), which includes the second output waveguide 23. Similarly, if the second traffic detector 43 observes an absence of traffic (C) over the second transmission route during the reflective state of the switch 10, it is likely that optic fibers connected to the second input waveguide 21 and the first output waveguide 19 have been damaged. Thus, it is desirable to avoid transmitting optical signals (B) over the first output waveguide.

Figure 3:
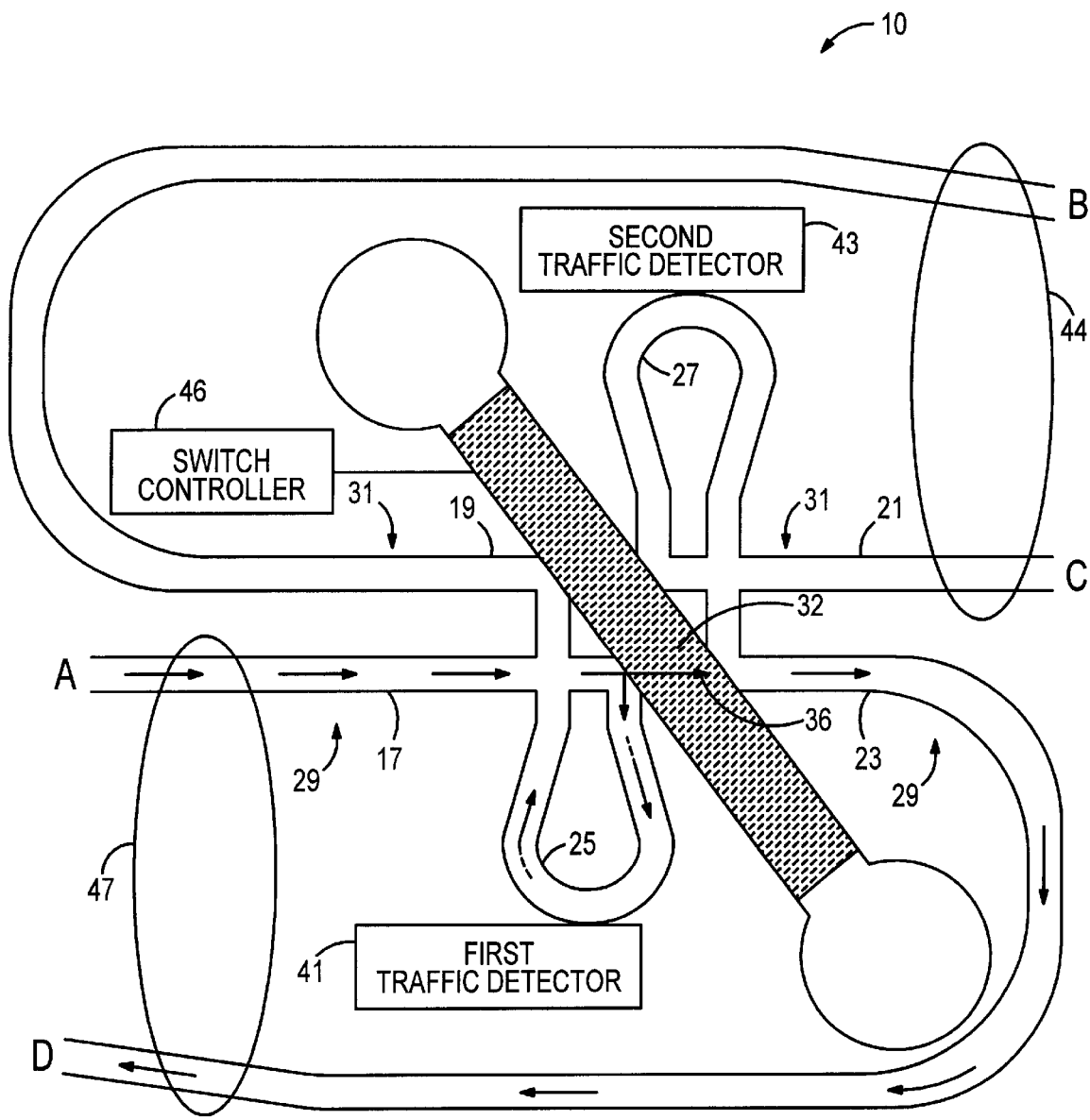
FIG. 3 is a schematic diagram of the switch of FIG. 2 operating in a transmissive state after a fault condition has been detected.

Referring to FIGS. 2 and 3, in response to either the first 41 or the second 43 traffic detector (but not both) detecting an absence of incoming traffic (A or C) over the first 13 or the second 15 transmission route, the switch controller 46 disables the normal reflective state and enables the substitute transmissive state of the switch. When the substitute transmissive state of the switch 10 is enabled, fluid fills a first region of the fluid-manipulable chamber 32. The fluid has an index of refraction which approximately matches the refractive index of the waveguide material. Presuming that the second traffic detector signals a (C) input fault condition, when the fluid fills the first region of the chamber 32, the first input waveguide 17 and the second output waveguide 23 are optically coupled to form a first transmission path 36 through the chamber 32. By enabling the transmissive state, traffic (A) is rerouted from the first route 13 to a first substitute transmission route 29 (A→D), which is formed by the first input waveguide, the second output waveguide and the fluid in the chamber. In this manner the switch avoids transmitting optical signals over the potentially faulty external line connected to the first output waveguide 19. Similarly, if the first traffic detector 41 observes an absence of traffic (A) over the first input waveguide 17, the switch controller 46 disables the reflective state and enables the substitute transmissive state to redirect traffic (C) from the normal second route 15 to a second substitute transmission route 31 (C→B) to avoid transmitting optical signals over the external line connected to the second output waveguide.

The first and second traffic detectors 41 and 43 can be utilized to verify that the substitute transmissive state of the switch 10 is functioning properly. For example, if an undesired bubble forms within the first transmission path 36 at the interface of the first input waveguide 17 and the chamber 32 during the transmissive state, optical signals (A) received over the first input waveguide 17 will be reflected onto the first intermediate waveguide 25. During proper operation of the transmissive state, the intensity of leakage light incidentally reflected onto the first output waveguide is low in comparison to the intensity of the optical signals. If the undesired bubble has formed in the chamber 32 during the transmissive state, the first traffic detector 41 recognizes that the intensity of light received over the first intermediate waveguide 25 is high and is not consistent with proper functioning of the transmissive state, and an alarm condition is triggered. In an alternative embodiment, external traffic detectors (not shown) can be located on the first output waveguide 19 and the second output waveguide 23 to monitor for proper operation of the transmissive state. For instance, an external traffic monitor on the second output waveguide 23 can detect a bubble as it forms within the first transmission path 36, because the enlarging bubble blocks propagation of light (A→D) through the switch onto the second output waveguide 23.

Figure 4:
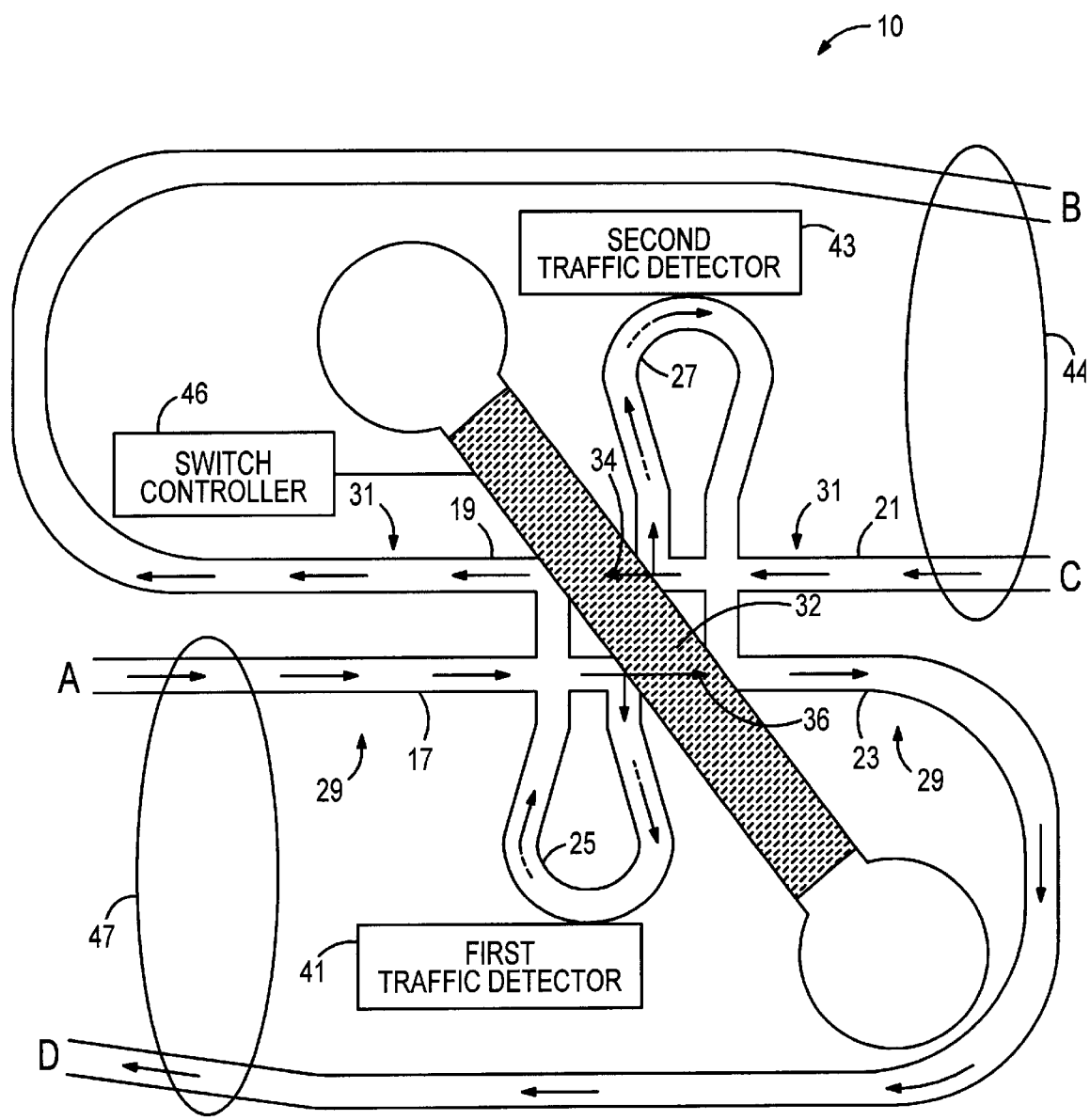
FIG. 4 is a schematic diagram of the switch of FIG. 2 after signal transmission has just resumed over a previously malfunctioning line.

When the switch is operating in the substitute transmissive state because the second traffic detector 43 has observed an absence of traffic received over the second input waveguide 21, the second traffic detector monitors the second input waveguide 21 for incidentally reflected light to determine whether the second input waveguide has returned to an operative state. Referring to FIGS. 2 and 4, if signal propagation (C) resumes over the second input waveguide 21, the optical signals (C) traverse the fluid-manipulable chamber 32 to form a second transmission path 34 through the chamber. If the index of refraction of the fluid which fills the first region does not precisely match the refractive index of the core material of the second input waveguide 21, a small amount of leakage from optical signals will be incidentally reflected from the interface of the chamber 32 and the second input waveguide 21. The incidentally reflected leakage light is represented by arrows having dashed tails. The incidentally reflected optical energy is interpreted as indicating that the condition which caused the malfunction in the upstream region of the second transmission route 15 has been remedied. Furthermore, it is assumed that the downstream region of the first transmission route has also been restored to an operative state as well. As a response to detection of the incidentally reflected optical signals over the second intermediate waveguide 27, the switch controller 46 disables the substitute transmissive state and re-enables the normal reflective state.

In an identical manner, the substitute transmissive state of the switch 10 is enabled if the first traffic detector 41 observes a prolonged absence of signal transmission (A) over the first input waveguide 17 when the switch 10 is in the normal reflective state. After the transmissive state is enabled, the first traffic detector 41 monitors the first intermediate waveguide 25 for incidentally reflected leakage light associated with resumed signal transmission over the first input waveguide 17. The optical switch 10 interprets the resumption of signal transmission (A) over the first input waveguide as indicating that the first and second transmission routes 13 and 15 have returned to an operational state. In response, the switch controller 46 disables the substitute transmissive state and re-enables the normal reflective state of the switch 10.

Figure 5:
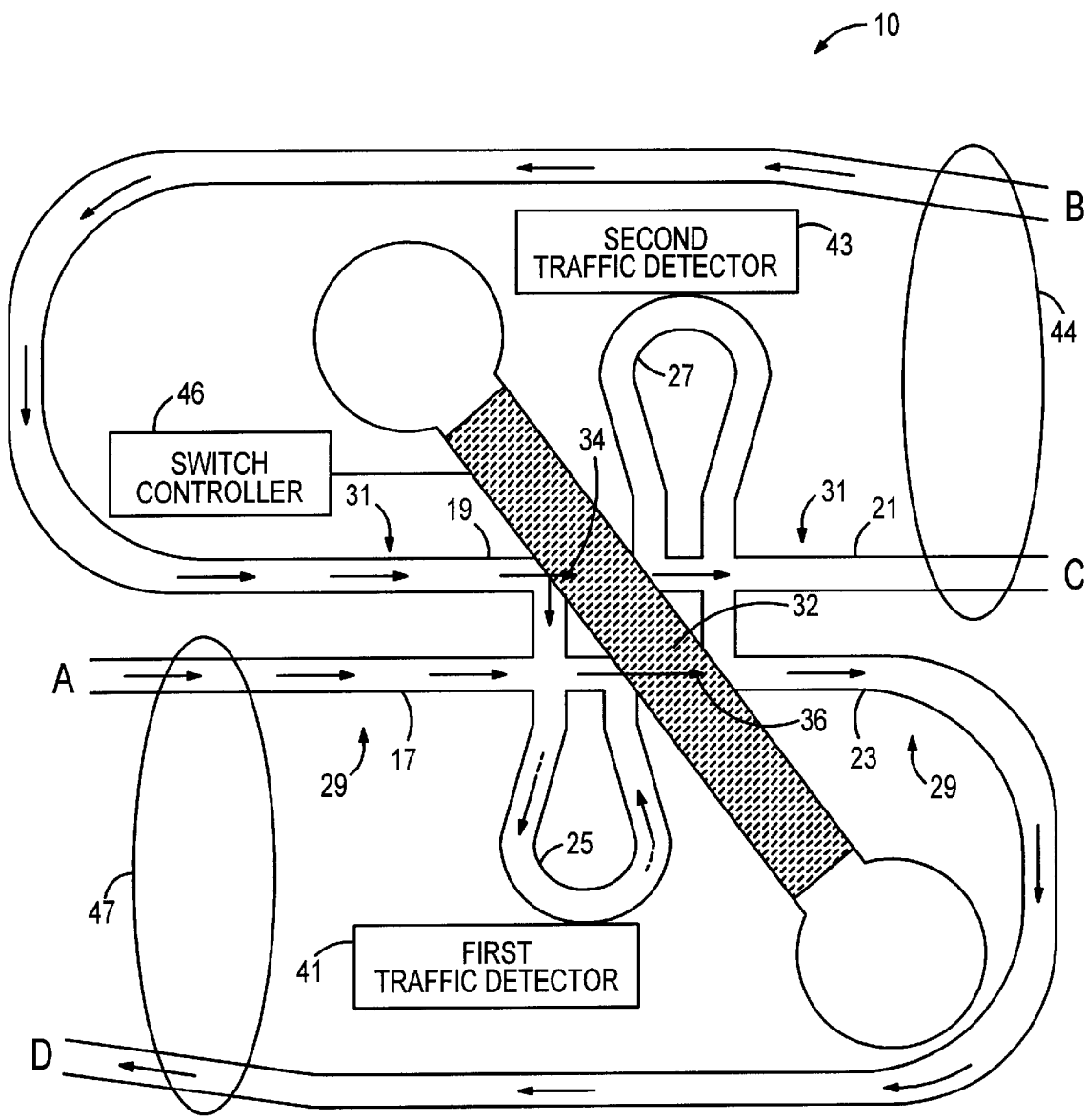
FIG. 5 is a schematic diagram of the switch of FIG. 2(a) performing a verification of the fault condition and (b) performing an additional diagnosis.

As noted above with reference to FIG. 2, if traffic (A or C) ceases over one of the input waveguides 17 and 21, it is assumed that the downstream region (B or D) of the other transmission route is inoperative. However, it is desirable to be able to verify this assumption, since the condition which has caused traffic over an input to one of the transmission routes (e.g., the second route 15) to cease might not have affected the downstream region of the other transmission route (i.e., the first transmission route 13). Referring now to FIG. 5, the first traffic detector 41 monitors the first intermediate waveguide 25 for a reverse driven signal which indicates that the downstream region of the first transmission route 13 is functioning properly. Such a reverse driven signal could be a "request for resumption" to the normal state of the switch. The first 41 and second 43 traffic detectors both preferably include a pair of directionally coupled evanescent detectors which distinguish the direction in which optical signals travel. In a preferred embodiment, the reverse driven signal is a remotely transmitted test signal (e.g., the request for resumption signal) having a different wavelength than the standard data bearing optical signals (A and C) in order to differentiate the reverse driven signals from data bearing optical signals.

The reverse driven signals received over the first output waveguide 19 travel through the second transmission path 34 during the transmissive state. However, as can be seen with reference to FIG. 5, a small amount of leakage light is incidentally reflected at the interface of the chamber 32 and the first output waveguide 19. In response to the first traffic detector 41 detecting the incidentally reflected leakage light of the reverse driven signal, the switch controller 46 disables the substitute transmissive state and re-enables the normal reflective state of the switch 10, returning the switch to the fault-free condition of FIG. 2. Similarly, when the substitute transmissive state was originally enabled because traffic (A) ceased over the first transmission route 13, the second traffic detector 43 monitors for incidentally reflected leakage light from reverse driven signals received over the second output waveguide 23. The switch controller 46 re-enables the normal reflective state of the switch 10 in response to detection of those reverse driven signals.

Preferably, a remote device (not shown) which generates the reverse driven signals continues to transmit the reverse driven signals after the reflective state has been enabled, thereby providing reassurance that the downstream region of the first 13 or the second 15 transmission route is still functioning properly.

Referring to FIGS. 2–6, a method for monitoring and controlling optical signal transmissions over a SONET ring network is described. At startup 50, the switch 10 is enabled in its normal reflective state, as indicated by step 52. In step 54, the first and second transmission routes 13 and 15 are monitored to confirm the continuation of incoming traffic (A and C). As long as the traffic detectors 41 and 43 continue to determine that traffic (A and C) is progressing as expected, steps 54 and 56 operate as a loop. The decision step 56 initiates a fault-response condition only if an unexpected absence of incoming traffic is detected along at least one route 13 or 15. When an unexpected absence is detected, the decision step 58 determines whether the absence is isolated to one of the routes or is a concern for both routes. When the signals are not present on both routes, the controller 46 leaves the switch in the normal reflective state and returns the process to the monitoring step 54. On the other hand, if incoming traffic has ceased over only one of the transmission routes, the switch controller 46 enables the substitute transmissive state at step 60.

In a first example, if step 60 was performed in response to an absence of signal reception (C) over only the second transmission route 15, enabling the transmissive state results in signal traffic (A) being switched from the first transmission route 13 to the substitute transmission route 29 (A→D). During the substitute transmissive state, the second traffic detector 43 monitors the second intermediate waveguide 27 at step 62 to determine at step 64 whether a forward driven signal has been detected. If the refractive index of the fluid within the chamber 32 does not precisely match the refractive index of the light-bearing core material of the second input waveguide 21, a small portion of each forward driven signal will be incidentally reflected onto the second intermediate waveguide 27. When a resumption of signal reception (C) over the second input waveguide 21 is detected, the switch controller 46 disables the substitute transmissive state and re-enables the normal reflective state in the switch, because it is presumed that the condition which caused a malfunction in the second transmission route 15 and which potentially caused a malfunction in the downstream portion of the first transmission route 13 has been remedied.

There is an important case in which a downstream party has a failure in that party's sending line only. Then, the party can request resumption of conventional operation. The "request for resumption" can be made with a reverse driven signal along that party's receiving line.

Figure 6:
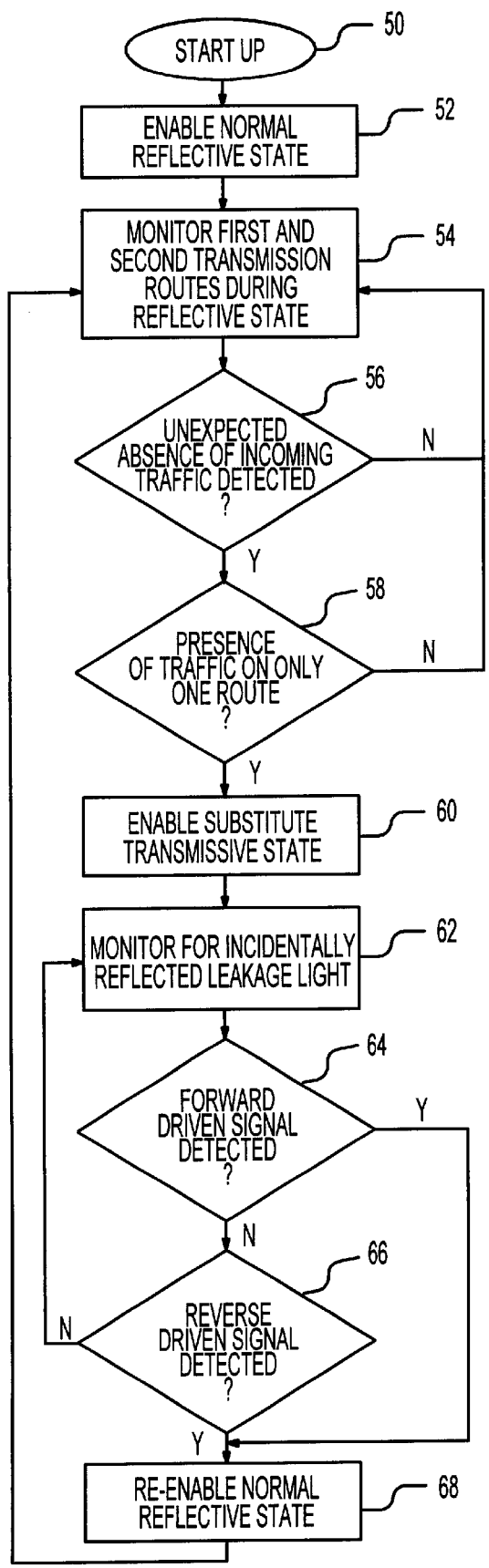
FIG. 6 is a process flow of a method for monitoring and controlling signal transmissions utilizing the switch shown in FIG. 2.

Continuing the first example of the method of FIG. 6, the first traffic detector 41 monitors the first intermediate waveguide 25 at step 66 for incidentally reflected light from a "request for resumption" reverse driven signal. Receipt of the reverse driven signal over the first intermediate waveguide indicates that the condition which caused the malfunction in the second transmission route 15 has not adversely affected the operation of the downstream portion of the first transmission route 13. In response, the switch controller 46 re-enables the normal reflective state at step 68. If neither a resumption of signal transmission over the second input waveguide nor a reverse driven signal over the first output waveguide 19 is detected, the switch 10 returns to step 62. After step 68, the switch returns to step 54, where the first and second transmission routes 13 and 15 are again monitored to determine if incoming traffic has ceased over either route.

Now turning to a second example, if the substitute transmissive state was enabled at step 60 because signal transmission (A) ceased over the first transmission route 13, then at step 62 the first traffic detector 41 monitors for the resumption of traffic (A), as evidenced by incidentally reflected leakage light. The first traffic detector 41 determines whether incidentally reflected leakage light is detected from a revived forward driven signal (A) received over the first input waveguide 17. Simultaneously, the second traffic detector 43 monitors for a reverse driven signal (D) received over the second output waveguide 23. Should neither the forward nor reverse driven signals be detected, the process returns to step 62. If either the forward or the reverse driven signal are detected, at step 68 the switch controller re-enables the normal reflective state and the first and second traffic detectors 41 and 43 resume monitoring the first and second transmission routes at step 54 to determine if signal reception has ceased over either route. In a third example, at decision step 58, it is determined that signal reception (A and C) has ceased over both transmission routes 13 and 15. In this situation, the normal reflective state is maintained until signal transmission resumes on one of the transmission routes. Thus, the process returns to the monitoring step 54.

Figure 7:
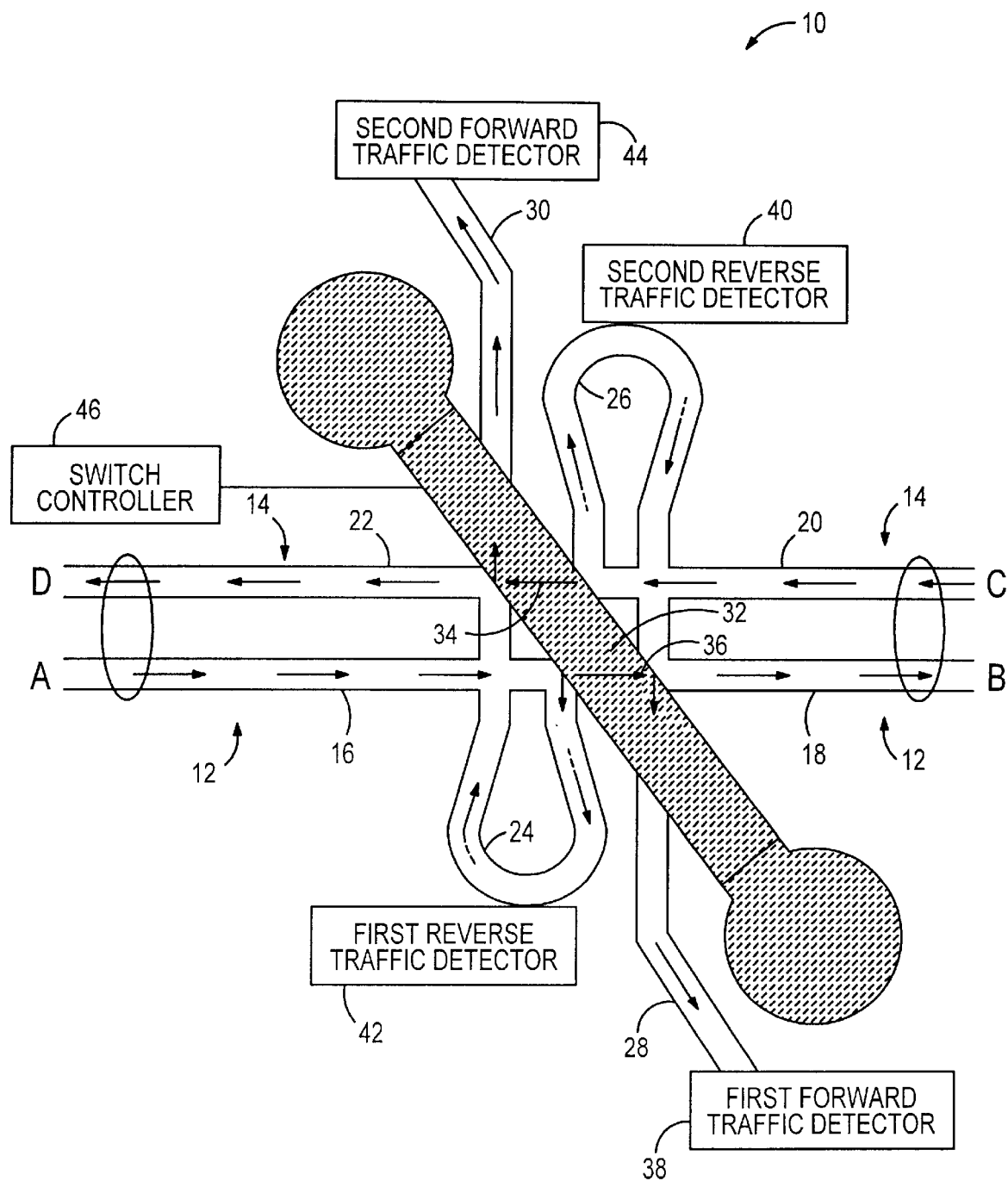
FIG. 7 is an alternative embodiment of the switch of FIG. 2 in a transmissive state.

With reference to FIG. 7, in a second embodiment, the switch 10 operates in a normal transmissive state in the absence of a detected fault condition. The switch monitors and controls signal transmission over a first linear path 12 (A→B) and a second linear path 14 (C→D). Each path carries network traffic uni-directionally, so that the first path 12 carries traffic in a first direction and the second path 14 carries traffic in the opposite direction. The first linear path 12 (A→B) includes an input waveguide 16 which connects to a first region of the fluid-manipulable chamber 32 of the switch. In the normal transmissive state of the switch, when the first region of the chamber 32 is filled with fluid having a refractive index which closely matches the refractive index of the waveguide core material, optical signals (A) propagate into the chamber from the first input waveguide 16. The light propagation forms the first transmission path 36 within the chamber and exits via a first output waveguide 18. In the normal transmissive state, light (C) which enters the fluid-manipulable chamber 32 from a second input waveguide 20 forms the second transmission path 34 through the chamber. The second transmission path exits the chamber 32 through a second output waveguide 22 of the second linear path 14.

Although it is desirable to have as close a match as possible for the refractive indices of the waveguides and the fluid within the chamber, it is likely that a small mismatch will occur. Consequently, a small amount of light will be reflected from the interfaces of the chamber 32 and the first and second output waveguides 18 and 22 and from the interfaces of the chamber 32 and the first and second input waveguides 16 and 20. For example, a fiberoptic signal (A) traveling along the first transmission path 36 will be partially reflected at the rear face of the chamber 32. A first monitoring waveguide 28 is connected to the chamber to receive the incidentally reflected signal and to direct it toward a first forward traffic detector 38 for the first linear path 12. The incidentally reflected light is represented as arrows having dashed tails. A second monitoring waveguide 30 is connected to the chamber 32 to receive light incidentally reflected from the second transmission path 34 and to direct the light toward a second forward traffic detector 44. The amount of light which is reflected from the rear face of the chamber is small, so the first and second forward traffic detectors are configured to recognize only power, not the information content of the reflected signals.

The first and second forward traffic detectors 38 and 44 can be utilized to monitor the operational state of the SONET ring network. However, first and second reverse detectors 42 and 40 provide more specific data regarding the operational state of the network and are therefore the preferred devices for performing the monitoring function. During normal operation of the network, the switch 10 is in the normal transmissive state and the first forward traffic detector 38 receives leakage light incidentally reflected from the rear face of the chamber 32. In addition, the first forward traffic detector 38 receives leakage light which is incidentally reflected from the second input waveguide 20 onto intermediate waveguide 26. Similarly, the second forward traffic detector 44 receives leakage light incidentally reflected from the rear face of the chamber 32 within the second transmission path 34 and receives leakage light incidentally reflected from the front face of the chamber 32 onto a first intermediate waveguide 24. Optical signals (A) which travel over the first linear path 12 will contribute an equal amount of leakage light to the first and second traffic detectors 38 and 44. Likewise, optical signals (C) which travels over the second linear path 14 will contribute equal amounts of leakage light to the first and second forward traffic detectors.

If signal propagation (C) ceases over the second transmission path 34, the first and second forward traffic detectors 38 and 44 will both observe a drop in the intensity of incidentally reflected leakage light. It may be known beforehand that optical signals (A or C) on one of the linear paths have a higher signal intensity than optical signals on the other linear path. In this case, it will be possible to ascertain which of the linear paths has ceased to carry traffic. For example, if signal intensity of traffic (A→B) on the first linear path 12 is three times as high as the signal intensity of traffic (C→D) on the second linear path 14, a 25 per cent decrease in the intensity of leakage light observed by both the first and second forward traffic detectors 38 and 44 indicates that signal transmission has ceased over the second linear path 14. However, if signal intensity, or some other difference between signal traffic on the first and second linear paths is not known beforehand, it will not be possible to identify which linear path has ceased to carry signal transmissions by utilizing the first and second forward traffic detectors 38 and 44.

In contrast, the first and second reverse traffic detectors 42 and 40 monitor the operational state of the network and provide specific information regarding which linear path has ceased supporting signal propagation (A or C). During the normal transmissive state, the first reverse traffic detector 42 receives leakage light incidentally reflected from the first input waveguide 16 at the front face of the fluid-manipulable chamber 32 onto the first intermediate waveguide 24. When the first reverse traffic detector 42 fails to detect any incidentally reflected light for a predetermined time interval, the absence of incidentally reflected light is interpreted as an indication of a fault condition associated with a failure in the first linear path 12 (A→B). The second reverse traffic detector 40 receives leakage light incidentally reflected from the second input waveguide 20 during the normal transmissive state of the switch. When the second reverse traffic detector 40 observes an absence of incidentally reflected leakage light, this is indicative of a fault condition associated with the second linear path 14 (C→D). Moreover, because optical fibers of the first and second linear paths are packaged closely together, it is possible that an event which caused a malfunction at a source of one of the paths also caused a malfunction at a destination end of the other path.

For example, if an optical fiber of the first linear path is broken while a trench is dug near fiberoptic lines connected to the first input waveguide 16 and the second output waveguide 22, it is likely that the optical fiber connected to the second path 14 has also been broken.

Figure 1:
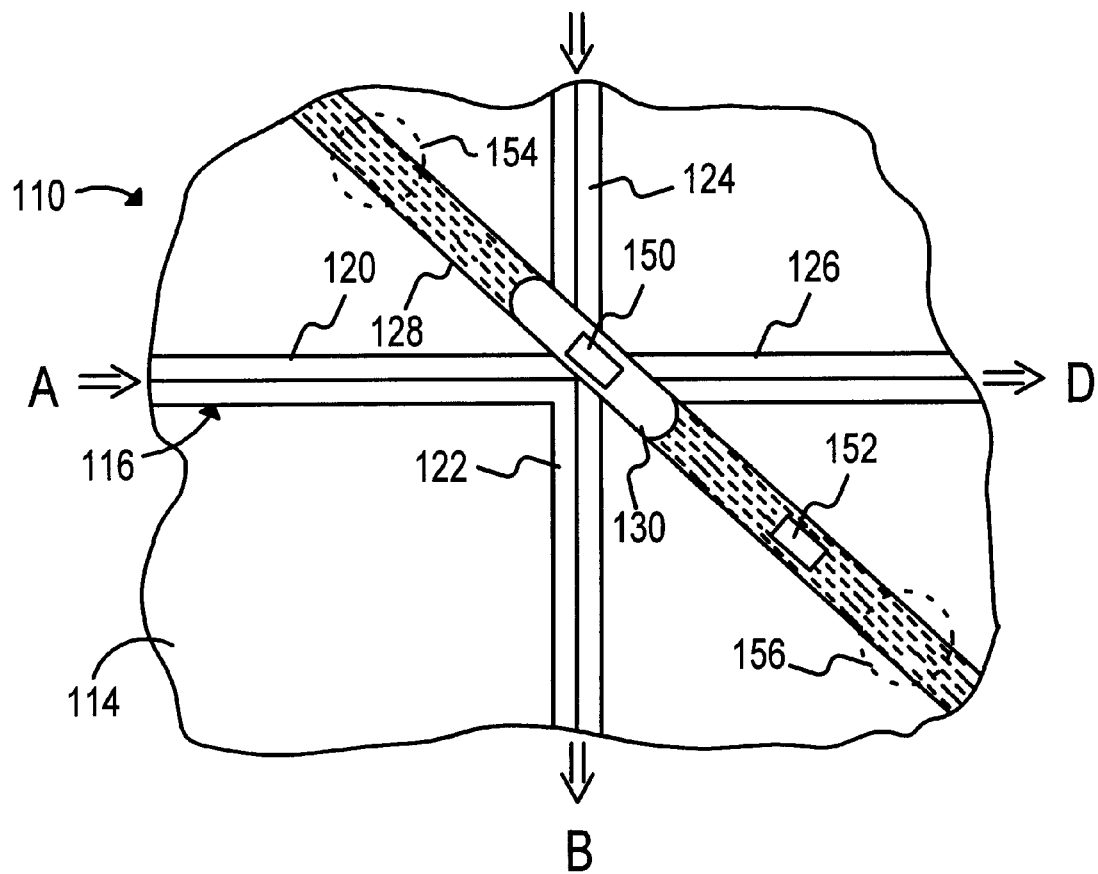
FIG. 1 is a schematic diagram of prior art optical switch.

The switch controller 46 communicates with the first 38 and second 44 forward traffic detectors and the first 42 and second 40 reverse traffic detectors to determine whether to maintain the normal transmissive state or to enable the substitute reflective state of the switch 10. Typically, this is achieved by selectively activating and deactivating heaters, as described with reference to FIG. 1. However, other methods of manipulating the index-matching fluid may be used without departing from the invention (e.g., inkjet techniques).

For purposes of illustration, the first and second input waveguides 16 and 20 are shown as being coaxially aligned with the first and second output waveguides 18 and 22. Since the refractive index of the fluid is not precisely matched to that of the waveguide material, there may be an advantage to providing a slight offset in the linear alignment of the input and output waveguides. As a separate issue, the drawings have shown the ninety degree angles between waveguides that exchange signals by reflection at the chamber. However, ninety degree angles are not critical.

Figure 8:
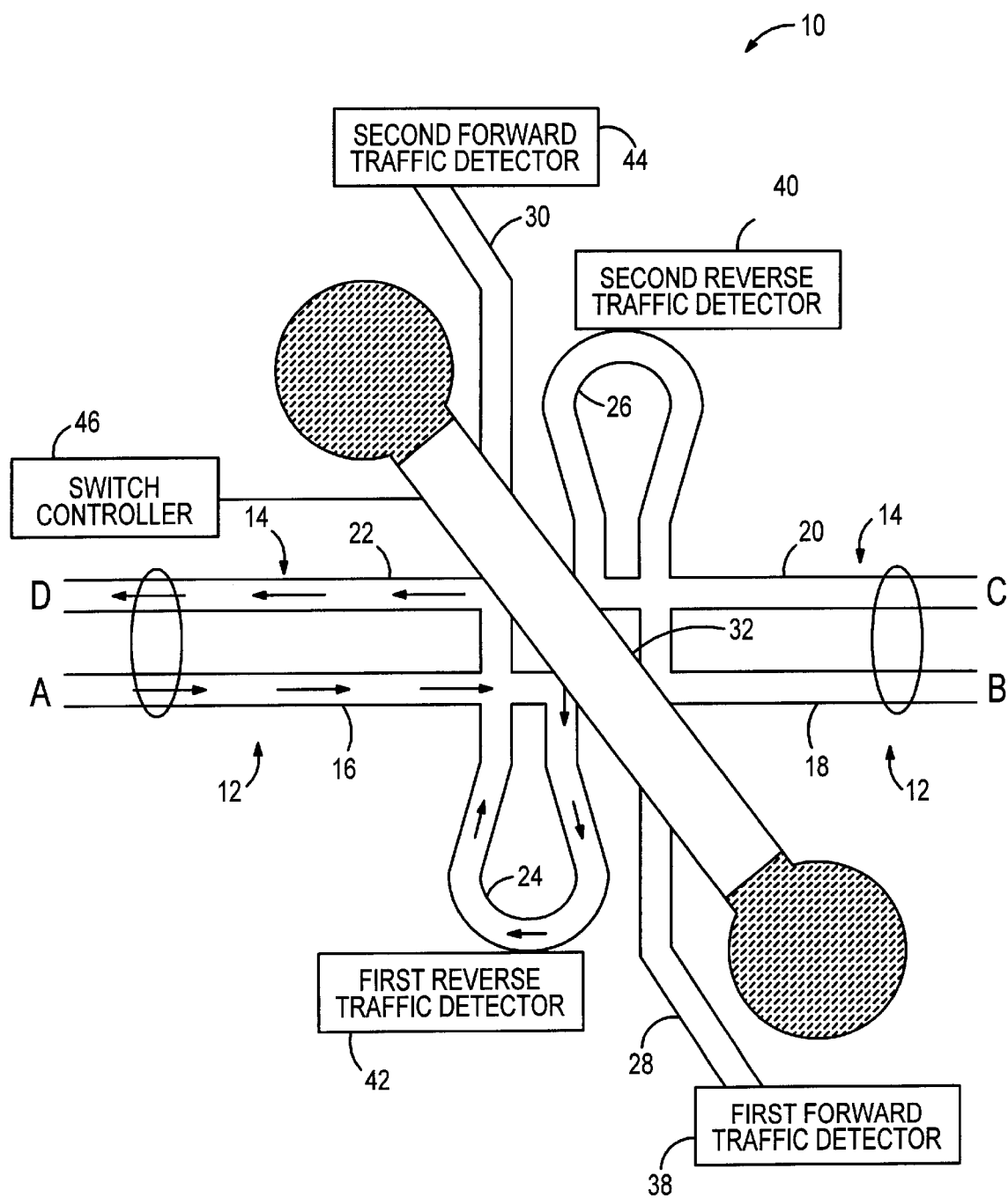
FIG. 8 is a schematic diagram of the switch of FIG. 7 in a reflective state after detection of a fault condition.

Referring to FIG. 8, if the second reverse traffic detector 40 fails to detect incidentally reflected light for a predetermined time interval, the second reverse traffic detector communicates the absence of detected traffic to the switch controller 46. Alternatively, the second forward traffic detector 44 can be utilized to monitor for traffic (C) received at the switch over the second input waveguide 20. As previously noted, the absence of incidentally reflected light detected by either the second forward traffic detector 44 or the second reverse traffic detector 40 indicates that the second path 14 (C→D) has been damaged somewhere upstream of the switch chamber 32. Furthermore, there is a likelihood that the optical fiber for exiting light (B) of first path 12 has been damaged downstream of the switch at the same location as the site where the second path 14 has been damaged. The switch controller 46 enables the substitute reflective state in the switch 10, thereby diverting the traffic away from the first output waveguide 18 by reflecting the traffic onto the first intermediate waveguide 24. The first intermediate waveguide 24 shares a common connection to the switch chamber 32 with the second output waveguide 22, so that traffic (A) is reflected onto the second output waveguide 22 of the second path 14 (i.e., a path A→D is formed). It should be understood that the switch controller 46 is also responsive to the first reverse traffic detector 42 to enable the substitute reflective state (to form a path C→B) in response to detection of an extended absence of incoming traffic (A) over the first path 12.

Figure 9:
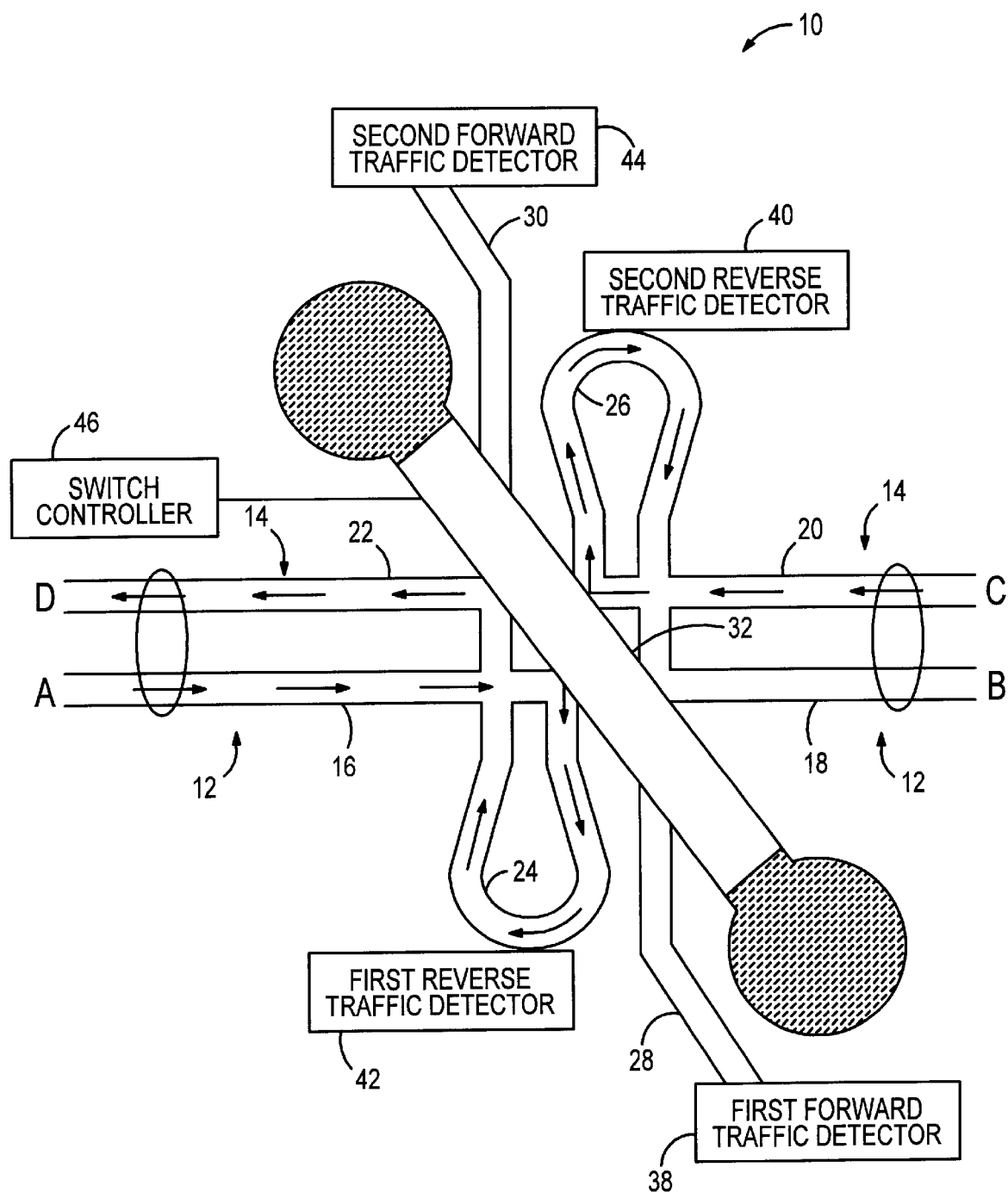
FIG. 9 is a schematic diagram of the switch of FIG. 7 when signal transmission has just resumed on a previously malfunctioning line.

Enablement of the substitute reflective state in the switch 10 when incoming traffic (A or C) is not detected on either the first or second input waveguides 16 and 20 is a temporary fault-response measure to ensure delivery of information carried on one of the paths when a portion of one of paths 12 and 14 is suspected of malfunctioning. Consequently, the switch continuously verifies that the fault condition is still present. Referring to FIG. 9, after the substitute reflective state has been enabled and incoming traffic (A) on the first input waveguide 16 is redirected to the second output waveguide 22 (A→D), the second reverse traffic detector 40 monitors for traffic (C) received over the second input waveguide 20. Because the switch is in the reflective state, any such traffic will be reflected onto the second intermediate waveguide 26, where it is detected by the second reverse traffic detector 40. If incoming traffic (C) is detected, it is presumed that the fault condition for the input for the second path 14 has been repaired. It is further assumed that the fault condition for the output (B) along the first path 12 has also been repaired. Consequently, the switch controller 46 enables the normal transmissive state and the optical switch 10 resumes operation over paths (A→B) and (C→D) as shown in FIG. 7.

Figure 10:
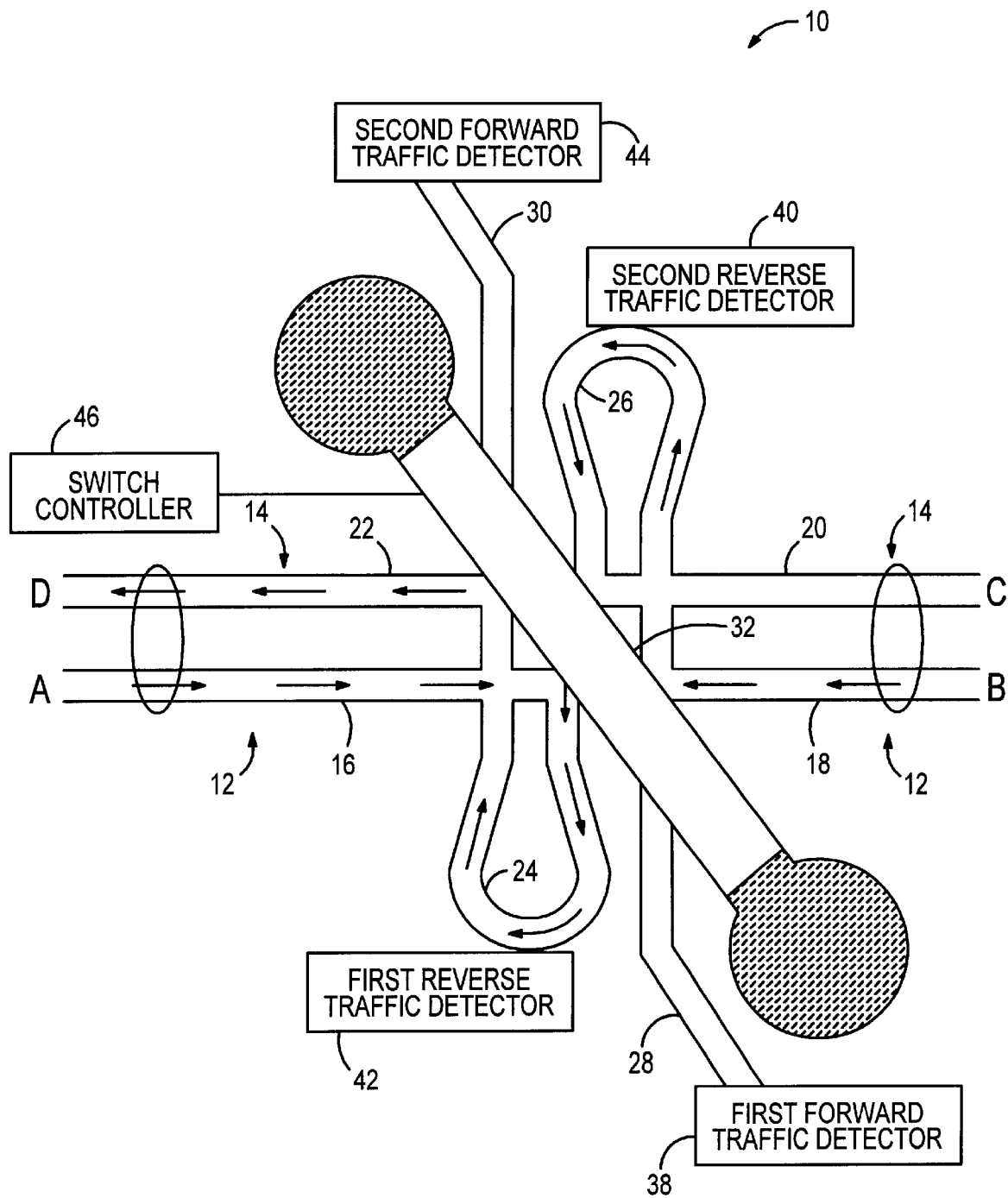
FIG. 10 is a schematic diagram of the switch of FIG. 9 as reverse driven "request for resumption" signals are being received over a line that was presumed to be malfunctioning.

In the operation of the optical switch of the present invention, it is assumed that if incoming traffic is not detected on one of the input waveguides, for example signals (C) of the second input waveguide 20, then the other path, namely the path 12, is also damaged downstream of the switch. Although this assumption can prevent transmission of data down the malfunctioning destination line, it is possible that the malfunction of the second path is unrelated to the operational condition of the first path. Therefore, it is desirable to provide a mechanism whereby the functional status of the downstream portion of the first path 12 can be verified after an absence of incoming traffic (C) has been observed on the second path. To this end, the second reverse traffic detector 40 monitors for a reverse driven "request for resumption" signal received over the first output waveguide 18 of the first path 12. Preferably, the reverse driven signal is of a different wavelength than the standard data-bearing fiberoptic signals (A and C) transmitted over the network, so as to differentiate the reverse driven signal from a forward driven signal (C) received over the second input waveguide 20. As can be seen with reference to FIG. 10, the reverse driven signal received over the first output waveguide 18 will be reflected onto the second intermediate waveguide 26 during the substitute reflective state. When the second reverse traffic detector 40 detects the reverse driven "request for resumption" signal, the switch controller 46 re-establishes the normal transmissive state in the switch to allow signal transmission to proceed over the first output waveguide 18 of the first linear path 12 (A→B).

Preferably, a remote device (not shown) which transmits the reverse driven "request for resumption" signals continues to transmit the reverse driven signals after the transmissive state has been enabled in order to provide reassurance that the portion of the first path 12 downstream of the switch 10 is still functioning. During the normal transmissive state, a small portion of the reverse driven signals will be incidentally reflected from the first output waveguide 18 onto the second intermediate waveguide 26 of the second path 14, where it will be detected by the second reverse traffic detector 40.

Figure 11:
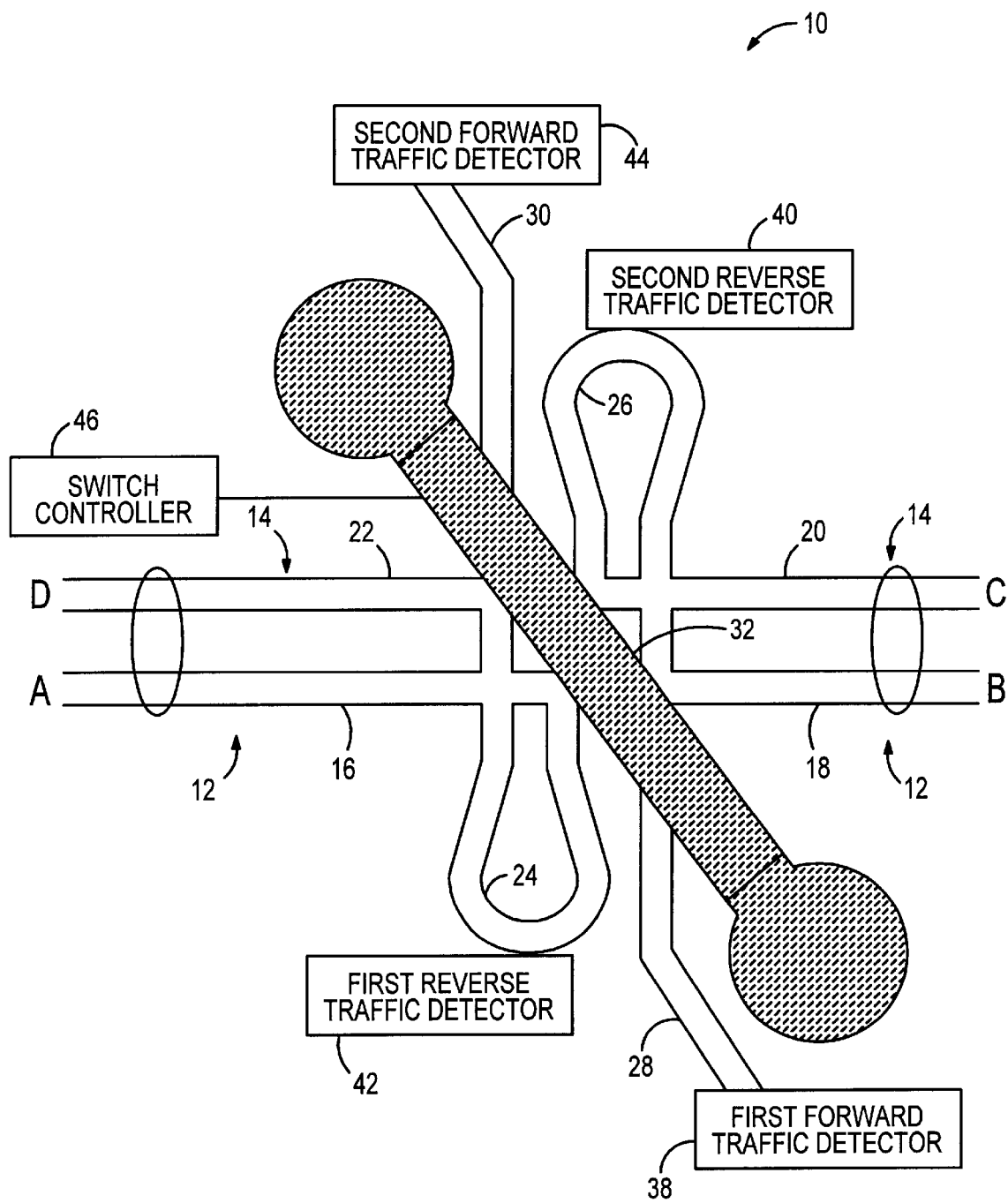
FIG. 11 is a schematic diagram of the fiberoptic switch of FIG. 7 in a transmissive state at rest in response to a determination that both lines are malfunctioning.

With reference to FIG. 11, if no incoming traffic (A and C) is detected over either of the paths 12 or 14, then the normal transmissive state of the switch is maintained.

Figure 12:
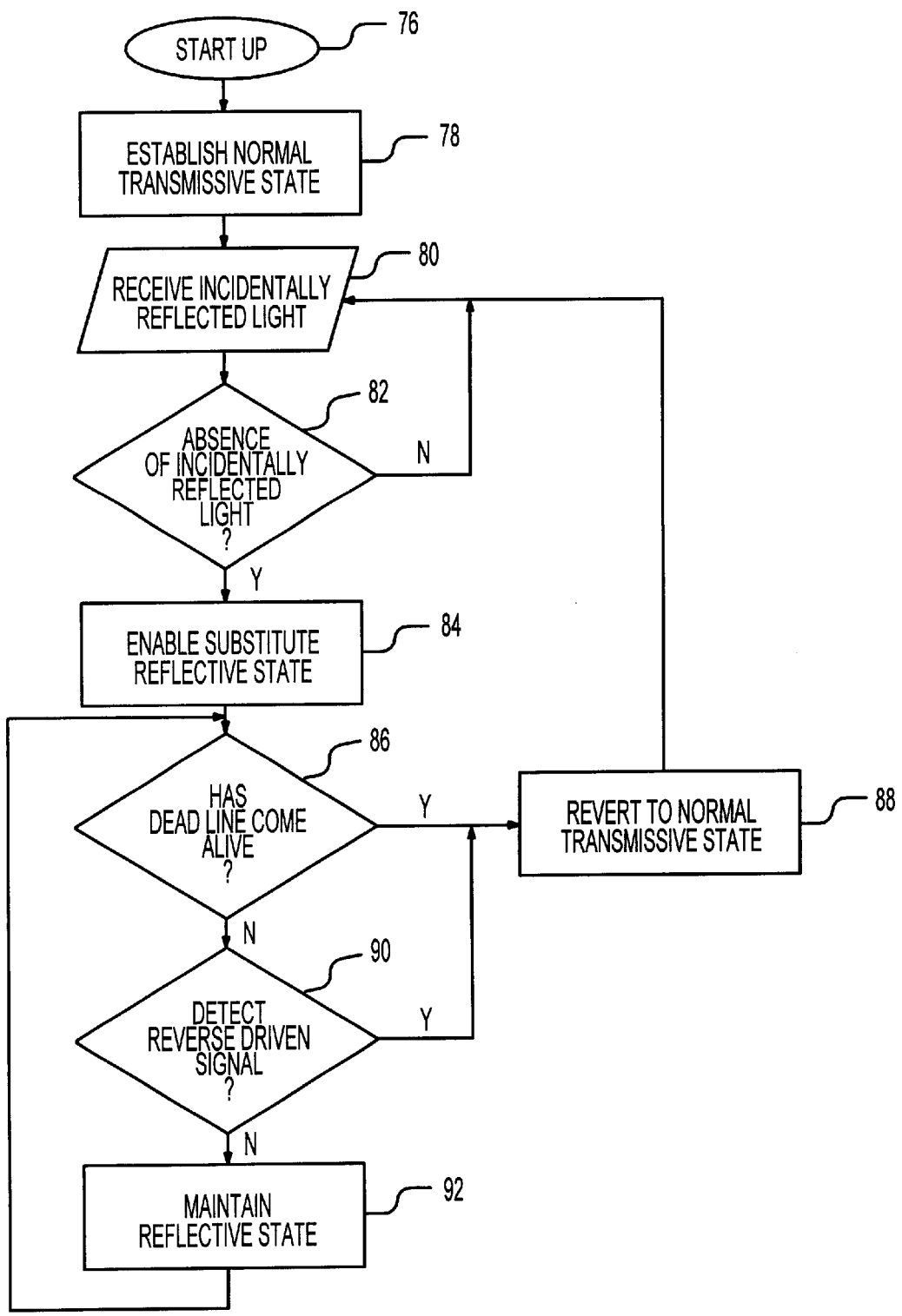
FIG. 12 is a process flow of a method for operating the switch of FIG. 7.

Referring to FIGS. 7 and 12, after a startup step 76, a method for monitoring and controlling data propagating over a fiberoptic network includes the step 78 of establishing the normal transmissive state of the switch 10. Then, in step 80, incidentally reflected light is received from interfaces of the switch chamber 32 with the first and second output waveguides 18 and 22. In one embodiment, the step of receiving the incidentally reflected light exclusively utilizes light reflected off the rear faces of the switch chamber 32. For example, light which is incidentally reflected from the first transmission path 36 within the switch chamber is captured by the first monitoring waveguide 28, where it is received and detected by the first forward traffic detector 38. Similarly, a small amount of light that is incidentally reflected from the rear face of the switch chamber 32 within the second transmission path is 34 captured by the second monitoring waveguide 30 and received by the second forward traffic detector. Alternatively or additionally, incidentally reflected light reflected at the front faces of the switch chamber 32 is captured by the first and second reverse traffic detectors 42 and 40.

Step 82 determines whether an absence of incidentally reflected light has been observed by the traffic detectors. As previously noted, the absence of incoming traffic on one path 12 and 14 (A→B) or (C→D) throws into question the reliability of the portion of the other path downstream of the switch 10. If incoming traffic along both paths is continuously detected, a loop is formed by steps 80 and 82, as the switch controller 46 maintains the normal transmissive state of the switch 10. On the other hand, if an absence of incidentally reflected light has been detected, in step 84 the switch controller 46 enables the substitute reflective state of the switch. During the reflective state, the switch reverses the connections for the incoming traffic (A and C). For example, if no incoming traffic (C) is detected on the second path 14, incoming fiberoptic signals (A) received over the first input waveguide 16 are rerouted onto the second output waveguide 22 of the second path 14. In this manner, traffic is prevented from traveling over the downstream portion of the potentially severed first fiberoptic line 12.

Step 86 is a decision step that determines whether the "dead" fiberoptic line, namely the line for which no incoming traffic has been detected, has come alive. For example, if the second path 14 is the dead line, the second reverse traffic detector 40 monitors for incoming traffic. When incoming traffic is detected, it is presumed that the second path has been repaired and that the first path 12 has been repaired as well. Therefore, the switch controller 46 reverts the switch to the normal transmissive state in step 88 and the process returns to step 80.

If no incoming traffic is detected over the second path 14, the second reverse traffic detector 40 monitors for a reverse driven "request for resumption" signal received over the first output waveguide 18 of the first path 12 in step 90. When the reverse driven signal is detected, the step 88 of reverting to the normal transmissive state is performed. If no reverse driven signal is detected, in step 92 the substitute reflective state of the switch is maintained. The process then returns to step 86.

What is claimed is:

1. An apparatus for monitoring and controlling transmissions of signals comprising:
   a fluid-manipulable chamber having a transmissive state in which fluid resides in a first region of said chamber, said chamber having a reflective state in which said fluid is absent from said first region, a first one of said transmissive and reflective states being selected for application during fault-free conditions with respect to signal transmissions, a second one of said transmissive and reflective states being selected for application during fault conditions;
   first and second input waveguides separately coupled to receive optical signals, said first and second input waveguides intersecting said chamber such that said optical signals propagate into said chamber when said chamber is in said transmissive state and reflect from said chamber when said chamber is in said reflective state;
   first and second output waveguides that are responsive to said transmissive and reflective states of said chamber such that said first and second output waveguides are respectively in signal-transfer engagement with said first and second input waveguides during said fault-free conditions and such that said first and second output waveguides reverse said signal-transfer engagements during said fault conditions;
   a signal traffic detection subsystem connected to detect incidentally reflected light from said chamber when said chamber is in said transmissive state, said incidentally reflected light being leakage light energy and being indicative of a fault-free condition; and
   a switch controller responsive to said signal traffic detection subsystem to establish said first one of said transmissive and reflective states during said fault-free conditions and to establish said second one during said fault conditions, wherein determinations of said fault-free and fault conditions are at least partially based on detections of said incidentally reflected light by said signal traffic detection subsystem.

2. The apparatus of claim 1 wherein said switch controller establishes said reflective state during said fault-free conditions, said first input waveguide and said second output waveguide being optically aligned on opposite sides of said chamber, said second input and said first output waveguides being optically aligned on opposite sides of said chamber, whereby said first and second input waveguides are respectively isolated from said second and first output waveguides when said chamber is in said reflective state during said fault-free conditions.

3. The apparatus of claim 2 wherein said signal detection subsystem includes a first detector coupled to monitor said optical signals propagating along said first input and output waveguides when said chamber is in said reflective state and to monitor said incidentally reflected light from an interface of said first input waveguide with said chamber when said chamber is in said transmissive state, thereby providing data relevant to signal connectivity of said first input waveguide to a first signal source.

4. The apparatus of claim 3 wherein said signal detection subsystem includes a second detector coupled to monitor said optical signals propagating along said second input and output waveguides when said chamber is in said reflective state and to monitor said incidentally reflected light from an interface of said second input waveguide with said chamber when said chamber is in said transmissive state, thereby providing data relevant to signal connectivity of said second input waveguide to a second signal source.

5. The apparatus of claim 4 wherein said signal detection subsystem is in communication with said switch controller to receive said data relevant to signal connectivity to said first and second signal sources.

6. The apparatus of claim 2 further comprising first and second intermediate waveguides, said first intermediate waveguide having a first end that intersects said first input waveguide at said chamber and having a second end that intersects said first output waveguide at said chamber, said second intermediate waveguide having a first end that intersects said second input waveguide at said chamber and having a second end that intersects said second output waveguide at said chamber, said signal traffic detection subsystem being coupled to said first and second intermediate waveguides to detect traffic propagating therethrough, wherein an absence of said traffic from at least one of said first and second input waveguides to said first and second output waveguides is indicative of a fault condition.

7. The apparatus of claim 1 wherein said signal traffic detection subsystem is enabled to monitor reverse driven signals from said first and second output waveguides to said first and second input waveguides, thereby providing data indicative of connectivity of said first and second waveguides to signal destination sites, said switch controller being responsive to said signal traffic detection subsystem to maintain said chamber in said first one of said transmissive and reflective states when both said first and said output waveguides are indicated as being connected to said signal destination sites.

8. The apparatus of claim 1 wherein said switch controller establishes said transmissive state during said fault-free conditions, said first input and output waveguides being optically aligned on opposite sides of said chamber, said second input and output waveguides being optically aligned on opposite sides of said chamber, said signal traffic detection subsystem including first and second forward traffic detectors that are coupled to said chamber to detect said incidentally reflected light that occurs when said optical signals from said first and second output waveguides impinge walls of said chamber.

9. An apparatus for monitoring and controlling transmissions over an optical signaling network comprising:
  a fluid-manipulable optical switch having a transmissive state in which fluid resides in a first region of said switch, said switch having a reflective state in which said fluid is absent from said first region;
  a first transmission route intersecting said first region and having a first input and a first output to said switch, said first input and said first output being optically coupled when said switch is in a first state of said transmissive and reflective states, said first transmission route being blocked when said switch is in a second state of said transmissive and reflective states;
  a second transmission route intersecting said first region and having a second input and a second output to said switch, said second input and said second output being optically coupled when said switch is in said first state, said second transmission route being blocked when said switch is in said second state;
  an optical sensor coupled to said switch to receive incidentally reflected light from at least one of said first and said second transmission routes during said transmissive state in order to detect a first operational state of said optical signaling network, a presence of said incidentally reflected light being indicative of said first operational state; and
  means responsive to said optical sensor for switching said switch between said transmissive state and said reflective state in response to detection of said first operational state.

10. The apparatus of claim 9 further comprising:
  a third transmission route sharing a common connection with said first transmission route to said first input and sharing a common connection with said second transmission route to said second output, said first input and said second output being optically coupled when said switch is in said reflective state;
  a fourth transmission route sharing a common connection with said second input and sharing a common connection with said first output, said second input and said first output being optically coupled during said reflective state.

11. The apparatus of claim 9 wherein said optical sensor and said switching means are configured to cooperatively enable said reflective state and disable said transmissive state upon detection of at least one of a reverse driven signal and a forward driven signal incidentally reflected at an interface of said switch with one of said first and said second transmission routes during said transmissive state.

12. The apparatus of claim 9 wherein said switching means is configured to enable said reflective state upon detection by said optical sensor of an absence of incidentally reflected light at an interface of said switch with one of said first and said second transmission routes during said transmissive state.

13. The apparatus of claim 12 wherein said switching means is configured to disable said reflective state and enable said transmissive state upon detection by said optical sensor of one of a reverse driven signal and a forward driven signal reflected at said interface during said reflective state.

14. In an optical switch having a transmissive state in which fluid fills a first region of said switch to form a first transmission path and a second transmission path through said first region, said switch further having a reflective state in which said fluid is withdrawn from said first region to divert signal transmission from said first transmission path to a third transmission path and from said second transmission path to a fourth transmission path, a method comprising steps of:
  monitoring said third transmission path for signal transmission during said reflective state;
  upon detecting an absence of signal transmission over said third transmission path, enabling said transmissive state;
  monitoring said first transmission path for leakage of incidentally reflected light during said transmissive state; and
  re-enabling said reflective state upon detecting said incidentally reflected light from said first transmission path.

15. The method of claim 14 wherein said step of monitoring said first transmission path includes determining if a reverse driven signal is incidentally reflected by said switch from said first transmission path onto said fourth transmission path.

16. The method of claim 14 wherein said step of monitoring said first transmission path is a step of determining whether a forward driven signal is incidentally reflected by said switch from said first transmission path onto said third transmission path.

17. The method of claim 14 further comprising the step of monitoring said third transmission path during said transmissive state to determine if said transmissive state is properly functioning in said switch.

18. The method of claim 17 wherein said step of monitoring said first transmission path during said transmissive state includes monitoring for high intensity signal transmission indicative of improper functioning of said transmissive state.

* * * * *